United States Patent [19]

Kilner

[11] Patent Number: 5,649,089
[45] Date of Patent: Jul. 15, 1997

[54] METHOD AND APPARATUS FOR MAINTAINING A REDUNDANT DATABASE SYSTEM

[75] Inventor: William Kilner, Monroe, Wash.

[73] Assignee: Motorola, Inc., Schaumburg, Ill.

[21] Appl. No.: 346,718

[22] Filed: Nov. 30, 1994

[51] Int. Cl.$^6$ .............................. G06F 11/08; G06F 17/30
[52] U.S. Cl. ..................... 395/182.04; 395/620; 395/488
[58] Field of Search ................................... 395/575, 600, 395/182.11, 185.07, 182.04, 620, 488; 371/8.1, 53

[56] References Cited

U.S. PATENT DOCUMENTS

| | | | |
|---|---|---|---|
| 4,849,978 | 7/1989 | Dishon et al. | 371/51 |
| 4,958,270 | 9/1990 | McLaughlin et al. | 364/187 |
| 5,049,873 | 9/1991 | Robins et al. | 340/825.06 |
| 5,261,092 | 11/1993 | McLaughlin et al. | 395/600 |
| 5,271,023 | 12/1993 | Norman | 371/68.3 |

FOREIGN PATENT DOCUMENTS 57-5162  1/1982  Japan.
2032149  4/1980  United Kingdom.

*Primary Examiner*—Robert W. Beausoliel, Jr.
*Assistant Examiner*—Ly V. Hua
*Attorney, Agent, or Firm*—Charles W. Bethards

[57] ABSTRACT

In a redundant controller system having an active controller (112) with an active data base and a standby controller (115) with a standby data base, the active controller (112) operably coupled to the standby controller (115), the active data base including a plurality of records, the plurality of records subject to modification, a method of updating the standby data base to mirror the active data base including modifying a record, the record including a record checksum, incorporating the record checksum into a virtual checksum (322) for the active data base, communicating the record including the record checksum to the standby data base (324), incorporating the record checksum into a standby checksum (410, 412) for the standby data base, and comparing the standby checksum to the virtual checksum (312) to insure the standby data base mirrors the active data base.

9 Claims, 4 Drawing Sheets

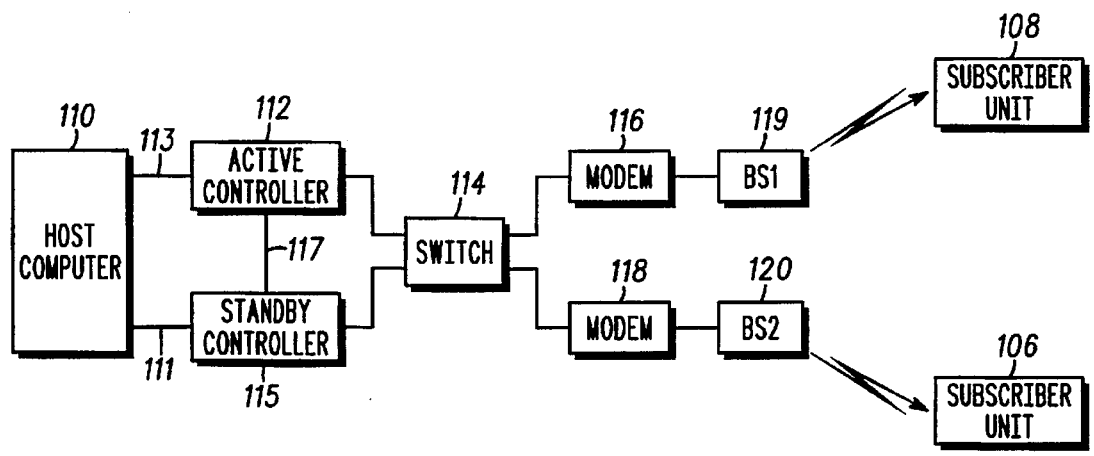
*FIG.1*
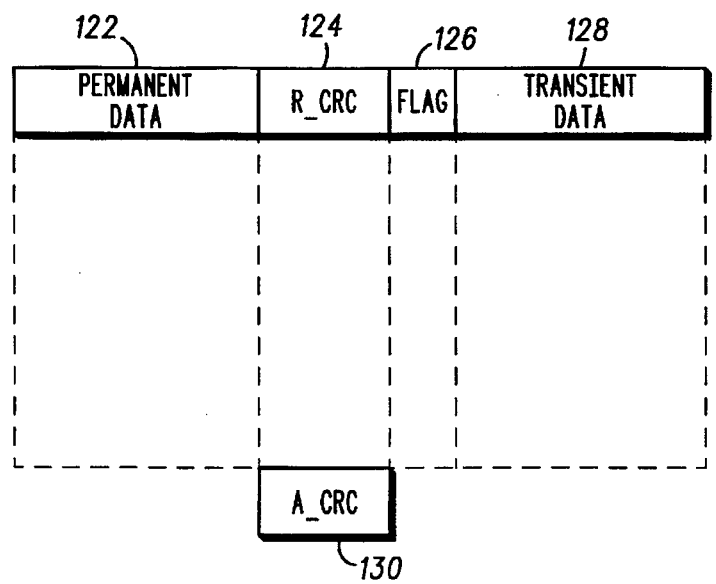
*FIG.1.1*

METHOD AND APPARATUS FOR MAINTAINING A REDUNDANT DATABASE SYSTEM

FIELD OF THE INVENTION

This disclosure deals with real time tracking changes to a data base within a data communication system and more specifically but not limited to maintaining a redundant database system.

BACKGROUND OF THE INVENTION

A database containing numerous small records is maintained in a network infrastructure controller available from manufacturers such as Motorola, Inc. at 1303 East Algonquin Road, Schaumburg, Ill. 60193. Generally, this active controller is redundant, with another controller in hot "Standby" mode ready to assume operation if the active controller becomes disabled. Changes in the data base of the active controller occur frequently and must be duplicated in the Standby controller in a nearly real time manner. Typically when, the time scale of the link between the controllers is longer than that of the processes which change the database records problems may arise. For example, the link between the controllers can be interrupted and subsequently resumed, such that cumulative changes to a record are lost and the entire data base associated with the standby controller will thus require re initialization.

One conventional method for updating a copy of a database is to lock each changed record until the change has been transferred to the copy. This is useful only if the time scale of the transfer is shorter than that of the process producing the change. Another method is to transfer the results of each change to the copy through a reliable link. In this case, the integrity of the copy is provided by the reliability of the link.

In either case, the method of verifying that the copy is identical to the original is to lock out changes to the original and the copy, compute a checksum on both, and compare them. If they are different, then the entire original must be transferred to the standby or copy before the original can be unlocked to allow further changes.

Deficiencies in updating using these methods are apparent when there are multiple changes to the same record causing multiple messages to be transferred through the update process, thus adding overhead under heavy loading conditions from data traffic when bandwidth may be the most scarce. Verification and re synchronization are also sources of deficiencies using these methods since it requires that changes be prevented during an interval that is far too long to be acceptable.

Clearly a need exists for a method of maintaining the integrity of the data base associated with the standby controller, without locking out changes of the data base associated with the active controller in a nearly real time environment.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

FIG. 1 is a block diagram of the data communication system including a network controller suitable for using an embodiment in accordance with the present invention;

FIG. 1.1 is an illustrative example of the format of a record contained in the database (DB) of the network controller of FIG. 1;

DETAILED DESCRIPTION OF A PREFERRED EMBODIMENT

Figure 2:
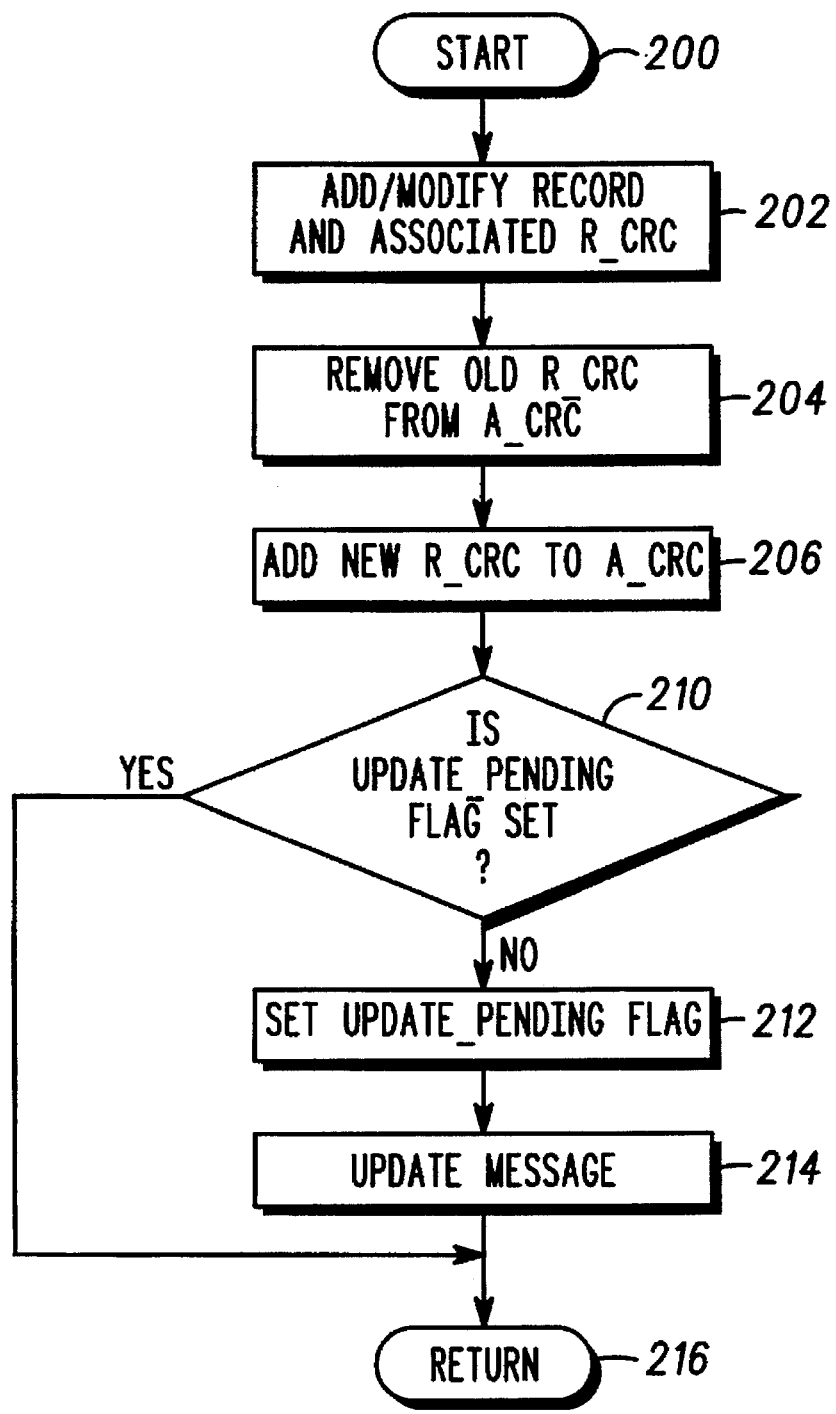
FIG. 2 is a flow chart depicting a preferred method of tracking changes to a database in accordance with the present invention.

Generally this disclosure deals with the real time tracking of changes to a data base within a data communication systems and more particularly to the maintenance of a redundant database in such systems. Typically the data communication system has an active controller 112 also referred to as the network controller and a standby controller 115. The standby controller 115 is arranged and constructed to assume the role of the active controller in the event that the active controller experiences a failure within the system. In the case where the active controller becomes disabled, the standby controller must be capable of performing the functions of the active controller. In order to effectively and efficiently perform the function of the active controller, the standby controller must be a substantially exact duplicate of the active controller, thus a redundant or standby database controller system must exist. In a redundant controller system the active controller maintains an active database and the standby controller maintains a standby database. The active controller must be operably coupled to the standby controller 115 via a link, such as a network link 111, 113 or a direct link 117.

The active database associated with the active controller includes a plurality of records each of which is subject to modifications from time to time. Those modifications must be communicated to and copied or mirrored in the standby database. In order to achieve the redundant controller system, a central processor (not specifically shown but included within the network or active controller) modifies a record which includes a record checksum and incorporates the record checksum into an active checksum for the active data base. The active controller communicates the record, including the record checksum, and record number to the standby controller for incorporation into the standby database and concurrently constructs a virtual checksum. The virtual checksum is the checksum the active controller expects the standby database to have after incorporation of the record being communicated. In this fashion the active controller may continue making record modifications as required, reflected in the active checksum, and provide record updates, on a compatible time scale, to the standby data base and yet retain the ability to compare, periodically, the standby checksum to the virtual checksum, thus insuring that the standby data base mirrors the active data base.

Referring to the FIG. 1 block diagram, a data communication system 100 comprises a host computer 110, an active network controller 112, a standby network controller 115, an A/B switch 114, an optional plurality of modems 116, 118, a plurality of base stations 119, 120, and a plurality of wireless subscriber units 106, 108. The network controller 112 is coupled to the host computer and transfers messages between the host computer 110 and the plurality of base stations 119, 120. The A/B switch 114 is used to switch between from the plurality of base stations 119, 120 or more specifically the optional modems if the base stations are remotely located and the active/network controller 112. When the host computer 110 or alternatively one of the network controllers gives the command, the A/B switch 114 is further used to switch between the active controller 112 and the standby controller 115 when it has been established that the active controller is no longer available. The plurality of modems 116, 118 are used to communicate over phone lines to the plurality of base stations 119, 120 if the base stations are remotely located. The plurality of base stations 119, 120 are used as stationary data transceivers and the plurality of wireless subscriber units 106, 108 function as two-way wireless messaging terminals operating to couple end users to the data communication network.

The message structure between the network controller(s) 112, 115 and the host computer 110 are communicated over a network link 111, 113 such as, for example, Transmission Control Protocol/Internet Protocol (TCP/IP) over ethernet, Single Port Asynchronous (ASYNC), Multiport ASYNC, Multiport Bisynchronous (BISYNC), X.25, and LU6.2. The network controller 112 controls all messages that enter or leave the data communications system 100. The active network controller 112 is responsible for converting the host computer 110 interface protocol to an RF protocol, managing the routing of messages from the host computer or a radio network gateway (not shown) to the plurality of wireless subscriber units 106, 108 and vice versa, eliminating duplicate messages within the RF network, acknowledging the receipt of messages from the subscriber units 106, 108, reporting to the host computer 110 the status of undeliverable messages, and forwarding alarms from the plurality of base stations 119, 120 to the host computer 110.

FIG. 1.1 is an illustrative example of the format of a record contained in the database (DB) of the network controller 112 in accordance with the present invention. The database (DB) in the network controller 112 is an array of records in system RAM (not specifically shown). The record includes a permanent data field 122, a record cyclic redundancy checksum (R_CRC) 124 also referred to as a record checksum, an update_pending flag 126, and a transient data field 128.

The permanent data field 122 is stored in the memory of the active controller and the standby controller. The R_CRC 124 is a 16 bit CRC on the permanent data field portion of the record and is used to maintain data base integrity. The update_pending flag 126 indicates the status of the record, specifically whether the record has been modified and not yet communicated to the standby controller. The transient data field 128 stores short term data, not necessary to the standby controller, for use in other processes throughout the system.

The system maintains an active_CRC (A_CRC) 130 referred to alternatively as a cumulative checksum of the entire DB for substantially real time tracking changes to a data base by providing a record checksum for a record and incorporating uniquely and reversibly the record checksum for the record into a cumulative checksum for the data base. Each record checksum is incorporated reversibly into this 32-bit value, by shifting its CRC-16 left by its record number modulo 16 and XOR-ing it into the cumulative checksum. This calculation detects the error of an identical record in a different location. An old R_CRC is backed out of the cumulative checksum, by performing the same process with that old R_CRC (i.e. shift old R-CRC left by its record number and XOR-ing.).

After any process has added a record or changed data in the permanent part of the DB record, that process must call a change tracking subroutine function, described below with reference to FIG. 2, before any other system process is called that could allow changes to a record. This function updates the record CRC to match the new data. If the Standby database is in sync or being resynched, and the update pending flag is not set, then a message is sent to the update processor (active processor executing the FIG. 3 process) indicating the record number (position in the array) and the former or old R_CRC, and the update pending flag is set.

Figure 3:
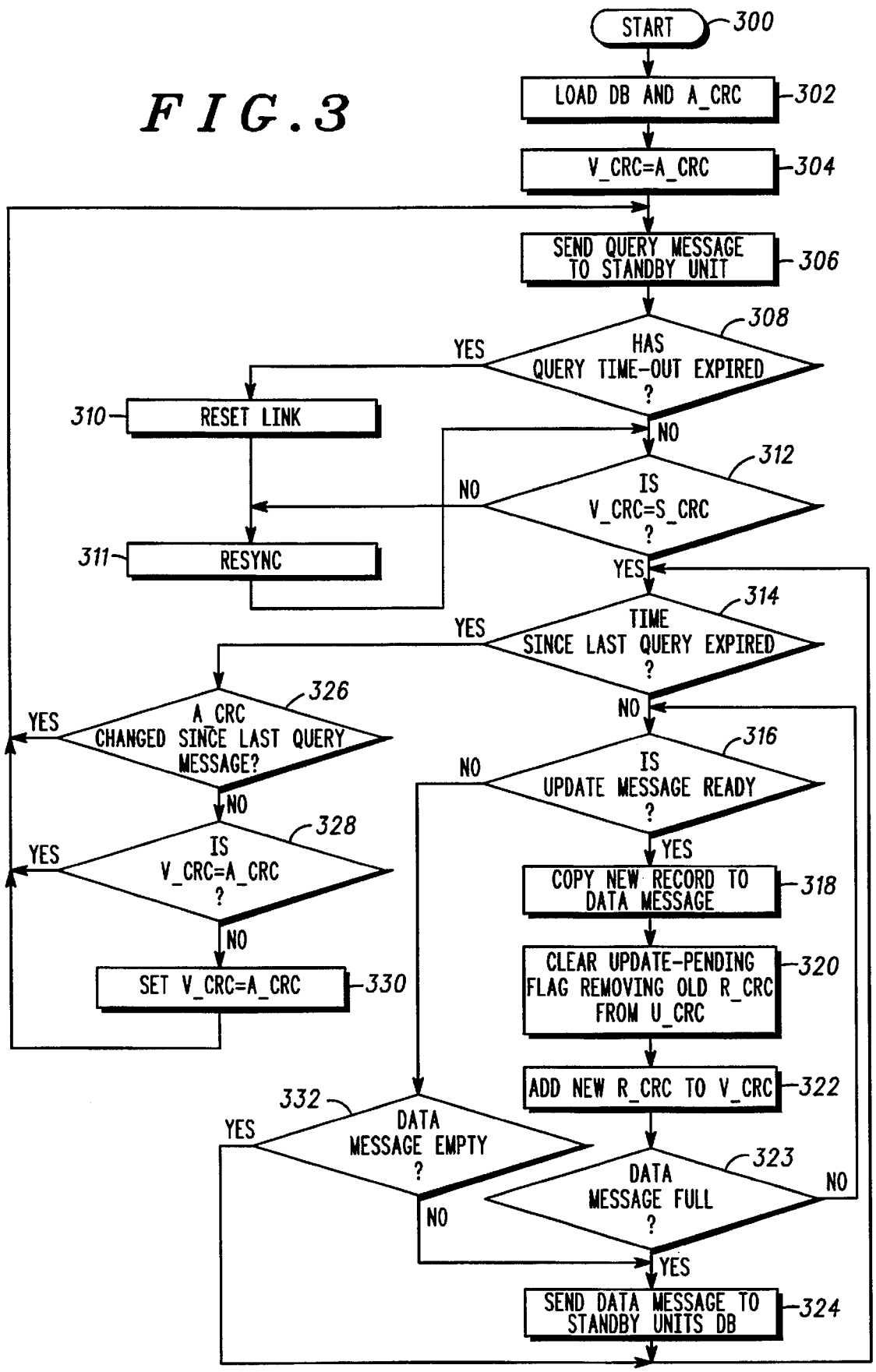
FIG. 3 is a flow chart depicting a method of updating a standby database in accordance with the present invention.
Figure 4:
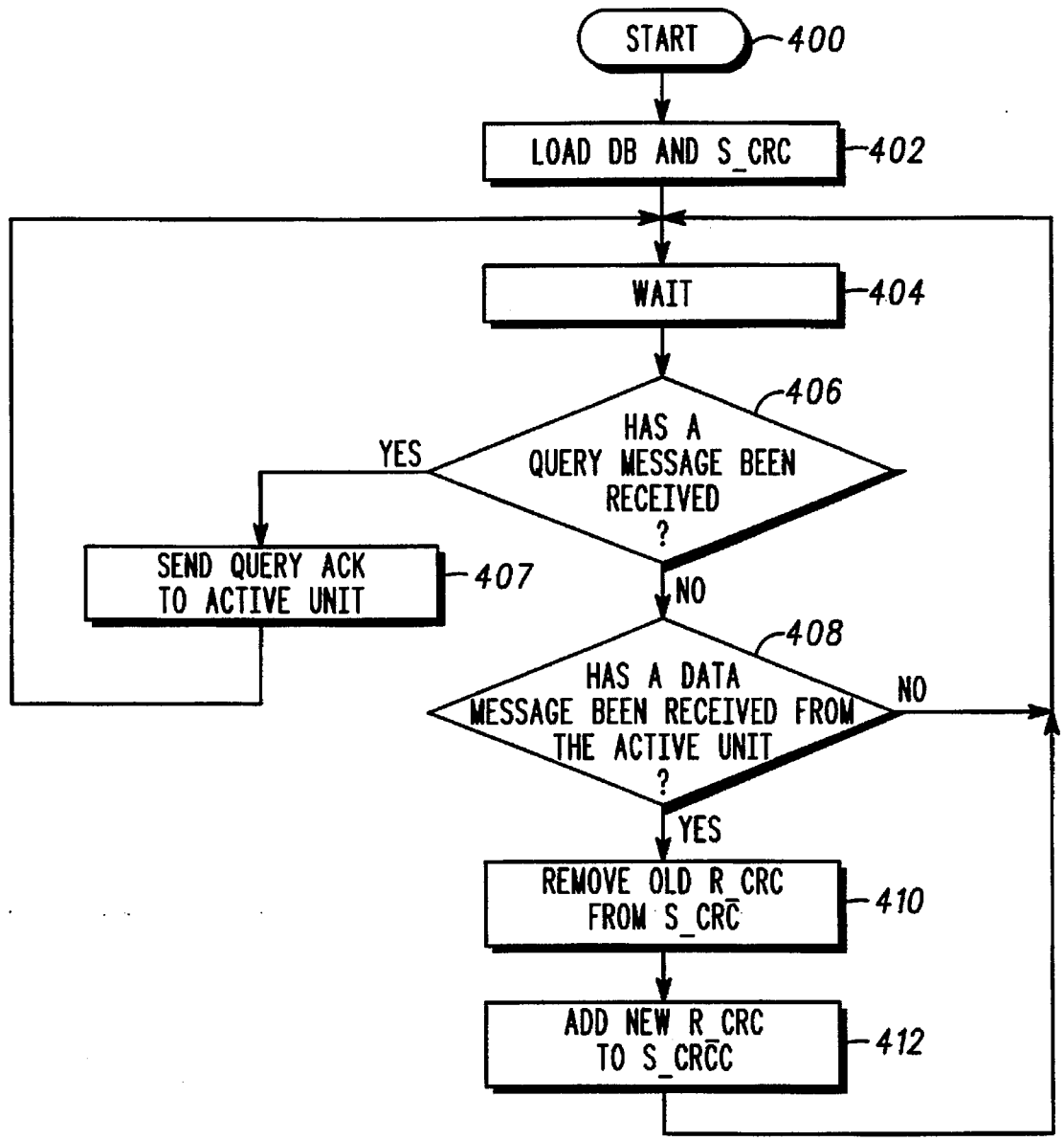
FIG. 4 is a flow chart depicting a method of updating a standby database practiced by the standby processor in accordance with the instant invention.

The DB redundancy system, FIG. 2–4 in combination, maintains the standby DB as a copy of the active DB. The standby DB is kept updated by communication from the active DB over a network link 113 as previously described in FIG. 1. Update or resynchronized data is streamed to the standby controller without acknowledgment. When the active controller 112 sends a record for update or re-synchronization, it clears the update pending flag, and enters that change into a virtual_CRC (V_CRC) which is representative of the CRC the active controller expects the standby controller's database to presently be.

On communication link up and at intervals, the active controller sends a query message and the standby controller responds with a query acknowledgment indicating the standby_CRC (S_CRC) of its DB. The active controller compares the S_CRC to the V_CRC, and declares the standby DB out of synchronization if the values differ.

FIG. 2 is a flow chart depicting a preferred method of tracking changes to a database in accordance with the present invention. Typically, a sub-routine is called by the main program in the network controller 112 of FIG. 1 when any task performed by the active controller results in a new/modified record and thus a new record checksum (R_CRC). Commencing with step 200 the method of FIG. 2 provides real time tracking of changes or updates to a database by providing a record checksum for a record and incorporating, uniquely and reversibly, the record checksum for the record into a cumulative checksum for the data base. Initially at step 202 the active processor adds or modifies the record to provide a new or modified record having a corresponding record checksum (R_CRC). At step 204 the processor removes the corresponding old record checksum (R_CRC) from the cumulative checksum (A_CRC). At step 206 the processor incorporates the new record checksum (R_CRC) for the new record into the cumulative checksum (A_CRC). At step 210 the update pending flag is checked to determine the status of the new or modified record. If the update pending flag is not set, then at step 212 the update pending flag is set and at step 214 an update message containing the record number and the old R_CRC is prepared for subsequent utilization by the process described below with reference to FIG. 3. Regardless of the update pending flag status at step 210, at step 216 the process returns to step 200 and repeats when another record is added or modified.

FIG. 3 is a flow chart depicting a method of updating a standby database in accordance with the present invention. Beginning at step 300, triggered by an initialization sequence, such as power on boot up of the active controller, the process proceeds to step 302 where the network controller loads or transfers the database from permanent storage, such as a file on a hard disk drive, to RAM and calculates an A_CRC. At step 304, the V_CRC is set equal to A—CRC, where V—CRC as previously stated, is representative of the CRC the active controller expects the standby controller's database to be, based on the last update in the system. At step 306, pursuant to insuring that the active and standby databases are identical or mirror images, the active controller sends a Query message requesting the standby controller to forward its S_CRC, (see step 406, 407). At step 308 a predetermined time-out typically 2–7 seconds, is checked. If the time-out has expired without receiving the S_CRC, at step 310, the communication link is reset and a re synchronization process is started by sending a re synchronization start message containing the current time to the standby controller at step 311. If the timeout has not expired or after the resync at step 311, then at step 312 the central processor determines if the V_CRC is equal to the S_CRC. If the V_CRC is not equal to the S_CRC then the process returns to step 311. If the V_CRC is equal to the S_CRC then at step 314 a time since last Query is checked. If the last Query time has not expired, at step 316 the process checks for the availability of an update message as provided by step 212 in FIG. 2. At step 318, if a new or modified record exists, i.e. an update message is available, the new/modified record, specifically the permanent data field of that record is copied into a data message. At step 320, once the record has been copied, the update-pending flag set at step 210 in FIG. 2 is cleared and the old R_CRC, provided as part of the update message, is removed from the V_CRC. At step 322 the new R_CRC is added to the V_CRC. At step 323 the processor determines whether the data message field is full. If the data message field is not full the process returns to and repeats from step 316. If the data message field is full, at step 324, the data message is sent to the standby controller for incorporation into the standby data base as further discussed below and the process returns to step 314.

At step 314 if the last Query time has expired the processor check to see if the A_CRC has been updated since the last query message was sent at step 326. If the A_CRC has not been updated since the last query message the processor determines whether the V_CRC is equal to the A_CRC at step 328. At step 330 the processor sets the V_CRC equal to the A_CRC, if at step 328 the CRCs are not equal and returns to step 306. If at step 326 the A_CRC has been updated the process also returns to step 306. If at step 328 the V_CRC is equal to the A_CRC the flow also returns to step 306.

At step 316 if no update data message is available, the process proceeds to step 332 where it is determined whether the data message field is empty. If the data message is not empty the flow proceeds to step 324 where the data message is sent to the standby controller. If the data message is empty the process returns to step 314.

FIG. 4 is a flow chart depicting a method of updating a standby database practiced by the standby processor in accordance with the instant invention. As previously stated, with reference to FIG. 2, the processor in the active controller first updates the active data base with a record, the record including a record checksum, and incorporates, reversibly, the record checksum into an active checksum for the active data base.

Beginning at step 400, responsive to an initialization sequence, such as power on boot up, the process proceeds to step 402 where the standby processor loads, from permanent storage such as a file on a hard disk drive, the Standby DB into memory and calculates a S_CRC on this DB. At step 404 the standby controller waits for the Query message (see step 306) or a data message (see step 324) from the active controller. At step 406 the standby processor determines whether a Query message has been received. Upon reception of the Query message, at step 407, the standby controller sends a Query acknowledgment message including the S_CRC indicating or acknowledging the reception of the Query message sent by the active controller. If a query message has not been received at step 406 the standby processor determines if a data message has been received at step 408. If so, responsive to the active controller sending the data message, including modified permanent data fields for various modified records, at step 408, the processor updates the standby DB with the new records and at step 410 removes the old R_CRC from the S_CRC of the standby DB. At step 412 the processor adds or incorporates the new R_CRC to the S_CRC, thus updating the standby checksum on the standby database to reflect the new record(s).

As previously stated, with reference to FIG. 3, the active processor generates a virtual checksum on the active database, and from time to time compares the virtual checksum to the standby checksum on the standby database, to insure the standby data base mirrors the active database.

It will be appreciated by those of ordinary skill in the art that the process and apparatus as described provides a method for substantially real time tracking of changes to a database by providing a record checksum for a record and incorporating uniquely and reversibly the record checksum for the record into a cumulative checksum for the database. Further by periodically comparing the cumulative checksum to a standby checksum similarly maintained these inventive techniques insure the standby data base mirrors the database.

It will also be apparent to the skilled that the disclosed invention may be modified in numerous ways and may assume many embodiments other than the preferred form specifically set out and described above.

Accordingly, it is intended by the appended claims to cover all modifications of the invention which fall within the true spirit and scope of the invention.

We claim:

1. In a data base comprising a plurality of records, each record having an associated checksum, a method of making changes to the data base including the steps of:

providing a cumulative checksum for the data base, incorporating uniquely and reversibly each record checksum for each record into a cumulative checksum for the data base;

changing the record from an old record to a new record and changing its associated checksum from an old checksum value to a new checksum value and substantially simultaneously reversing the incorporation of the old checksum value from the cumulative checksum and incorporating the new checksum value into the cumulative checksum.

2. The method of claim 1 further including the steps of:

providing a standby data base comprising a standby record and an associated standby, record checksum corresponding to each of said plurality of records and associated checksums;

communicating said new record and said new checksum value to a standby data base and incorporating said new checksum value uniquely and reversibly into a standby cumulative checksum to insure the standby data base mirrors the data base.

3. A method of real time tracking updates to an active data base including the steps of:

providing a record and an associated first record checksum;

providing a cumulative checksum for the active data base and incorporating said associated first record checksum for said record into said cumulative checksum;

modifying said record and said associated first record checksum to provide a new record having a second record checksum;

removing said first record checksum from said cumulative checksum; and incorporating said second record checksum for said new record into said cumulative checksum.

4. The method of claim 3 wherein said step of modifying further includes the steps of:

setting an update pending flag within said record; and responsive to said update pending flag, updating a virtual checksum by removing said first record checksum from said cumulative checksum for the active database and incorporating said second record checksum into said virtual checksum.

5. The method of claim 4 further including a step of comparing said virtual checksum to a standby checksum on a standby database.

6. The method of claim 5 further including a step of updating the standby database to equal the active database when said virtual checksum is not equivalent to said standby checksum thereby insuring the standby database mirrors the active database.

7. A method of updating a standby database to mirror an active database including the steps of:

first updating a record of the active database with a new record, said new record including a new record checksum;

providing a virtual checksum for the standby database and incorporating, reversibly, said new record checksum into said virtual checksum;

communicating said new record from the active database to the standby database;

second updating the standby database with said new record;

providing a standby checksum for the standby database; and comparing said standby checksum to said virtual checksum to insure the standby database mirrors the active database.

8. The method of claim 7 further including a step of making the standby database equal to the active database when the virtual checksum is not equivalent to the standby checksum thereby insuring the standby data base mirrors the active database.

9. In a redundant controller system having an active controller with an active database and a standby controller with a standby database, the active controller operably coupled to the standby controller, the active database generating a virtual cumulative checksum and including a plurality of standby database to mirror the active data base including the steps of:

modifying a record of the active database with a new record, said new record including a new record checksum;

incorporating said new record checksum into said virtual cumulative checksum for said active database;

communicating said new record and said new record checksum to said standby database;

incorporating said new record checksum into a standby cumulative checksum for said standby database; and comparing said standby cumulative checksum to said virtual cumulative checksum to insure said standby database mirrors said active database.

* * * * *

UNITED STATES PATENT AND TRADEMARK OFFICE
CERTIFICATE OF CORRECTION

PATENT NO. : 5,649,089
DATED : July 15, 1997
INVENTOR(S) : William Kilner

It is certified that error appears in the above-identified patent and that said Letters Patent is hereby corrected as shown below:

At column 6, lines 33-62 all of the occurrences of "database" reads "data base" --which should be "database".

At column 6, line 38 it reads "a cumulative" -- should be "the cumulative".

At column 6, line 40 it reads "the record" -- should be "a record".

Signed and Sealed this

Sixth Day of January, 1998

Attest:

BRUCE LEHMAN

Attesting Officer

Commissioner of Patents and Trademarks